UNITED STATES PATENT OFFICE.

FRANZ SEHR, OF BLANKENHAIN, NEAR WEIMAR, GERMANY.

MANUFACTURE OF FILTERS.

972,723.

Specification of Letters Patent.  Patented Oct. 11, 1910.

No Drawing. Application filed February 15, 1910. Serial No. 544,053.

*To all whom it may concern:*

Be it known that I, FRANZ SEHR, mechanical engineer, a subject of the German Emperor, residing at Blankenhain, near Weimar, Germany, have invented certain new and useful Improvements in or Relating to the Manufacture of Filters, of which the following is a specification.

My invention relates to a process for the manufacture of filters for purifying water, oil and any other desired liquids, solutions and the like, and chiefly consists in quartz sand, the size of grains of which is chosen in accordance with the object for which the filter is to be used, being thoroughly mixed with 5% feldspar and 15% kaolin. The mixture is effected dry in order to prevent the kaolin from getting into the pores of the sand. The mass is thereupon rammed into gypsum molds and burned or calcined with the gypsum mold in furnaces at 1400 to 1500° C. The gypsum mold prevents the filter from falling to pieces and, therefore, holds it together in the fire until the mass adheres automatically, owing to the calcining. The gypsum mold does not melt with the mass, but becomes detached from it as the material contracts, that is to say, becomes disconnected from the filter.

The filter material is sharp grained, so that a high degree of filtration is insured, and the filter can be easily cleaned and always remains hard and does not get filled up with mud.

What I claim is:

A process for the manufacture of filters for any desired purposes or filter cartridges in the shape of hollow cylinders, consisting in quartz sand of size of grain corresponding to the object for which the filter is to be used, being thoroughly mixed dry with 5% feldspar and 15% kaolin, and thereupon being rammed into gypsum molds and calcined with the gypsum molds in furnaces at 1400–1500° C., the gypsum molds preventing the filter from falling to pieces during the burning, and the mass from melting to the molds, the latter becoming detached from the material as it contracts.

In testimony whereof I have hereunto set my hand in presence of two subscribing witnesses.

FRANZ SEHR.

Witnesses:
 ERNST EBERHARDT,
 GUSTAV LAUTNER, Jr.